(12) United States Patent
Imanishi et al.

(10) Patent No.: US 11,274,187 B2
(45) Date of Patent: Mar. 15, 2022

(54) CELLULOSE ESTER COMPOSITION

(71) Applicants: DAICEL POLYMER LTD., Tokyo (JP); DAIHACHI CHEMICAL INDUSTRY CO., LTD., Osaka (JP)

(72) Inventors: Shinichiro Imanishi, Himeji (JP); Yasuo Okumura, Himeji (JP); Kazunobu Yanai, Higashiosaka (JP)

(73) Assignees: DAICEL POLYMER LTD., Tokyo (JP); DAIHACHI CHEMICAL INDUSTRY CO., LTD., Osaka (JP)

( * ) Notice: Subject to any disclaimer, the term of this patent is extended or adjusted under 35 U.S.C. 154(b) by 271 days.

(21) Appl. No.: 16/592,011

(22) Filed: Oct. 3, 2019

(65) Prior Publication Data

US 2020/0032032 A1    Jan. 30, 2020

Related U.S. Application Data

(62) Division of application No. 14/436,242, filed as application No. PCT/JP2013/077932 on Oct. 15, 2013, now Pat. No. 10,494,503.

(30) Foreign Application Priority Data

Oct. 19, 2012 (JP) .................. 2012-231816

(51) Int. Cl.
*C08K 5/11* (2006.01)
*C08K 5/10* (2006.01)

(52) U.S. Cl.
CPC . *C08K 5/11* (2013.01); *C08K 5/10* (2013.01)

(58) Field of Classification Search
None
See application file for complete search history.

(56) References Cited

U.S. PATENT DOCUMENTS

| | | | | |
|---|---|---|---|---|
| 5,484,826 A | * | 1/1996 | Kressdorf | B01J 2/00 106/169.01 |
| 2005/0228092 A1 | | 10/2005 | Fujita et al. | |
| 2008/0036119 A1 | | 2/2008 | Kanazawa | |
| 2009/0030160 A1 | | 1/2009 | Kanazawa et al. | |
| 2012/0253071 A1 | | 10/2012 | Rau et al. | |
| 2015/0196667 A1 | | 7/2015 | Rau et al. | |

FOREIGN PATENT DOCUMENTS

| | | |
|---|---|---|
| CN | 1646470 A | 7/2005 |
| CN | 101125929 A | 2/2008 |
| CN | 101146851 A | 3/2008 |
| CN | 102686245 A | 9/2012 |
| JP | 10-306175 A | 11/1998 |
| JP | 2005-023091 A | 1/2005 |
| JP | 2005-146261 A | 6/2005 |
| JP | 2005-194302 A | 7/2005 |
| JP | 2007-077300 A | 3/2007 |
| JP | 2008-260895 A | 10/2008 |
| JP | 2009-173740 A | 8/2009 |
| JP | 2011153296 A | 8/2011 |
| JP | 2012-025804 A | 2/2012 |
| WO | 03/087031 A1 | 10/2003 |

OTHER PUBLICATIONS

English language International Search Report for PCT/JP2013/077932, dated Dec. 24, 2013 (2 pages).
English translation of International Preliminary Report on Patentability and Written Opinion of the International Searching Authority for PCT/JP2013/077932, dated Dec. 24, 2013 (5 pages).
Supplementary European Search Report for corresponding application No. EP 13847762, dated Apr. 8, 2016 (6 pages).
Moisture-impermeable cellulose compositions and their films, by Masashi Harada et al, XP-002755812, C:\EPODATA\SEA\eplogf\external.log, dated Mar. 23, 2016 (2 pages).
Chinese Office Action for corresponding application No. 201380054706.X, dated Jun. 22, 2016 (8 pages).
Aerobic Biodegradation of Cellulose Acetate, by Charles Buchanan et al, Journal of Applied Polymer Science, 1993, vol. 47, pp. 1709-1719 (11 pages).

* cited by examiner

*Primary Examiner* — Yun Qian
(74) *Attorney, Agent, or Firm* — Flynn Thiel, P.C.

(57) ABSTRACT

To provide a cellulose ester composition having good thermoplasticity. The cellulose ester composition including: (A) a cellulose ester and (B) a plasticizer, wherein the plasticizer of the component (B) includes at least one kind selected from adipic acid esters respectively represented by the following formulae (I), (II) and (III).

(Formula 1)

5 Claims, No Drawings

CELLULOSE ESTER COMPOSITION

CROSS-REFERENCE TO RELATED APPLICATION

This is a divisional of prior U.S. application Ser. No. 14/436,242, which was the national stage of International Application No. PCT/JP2013/077932, filed Oct. 15, 2013.

TECHNICAL FIELD

The present invention relates to a cellulose ester composition.

BACKGROUND ART

Since cellulose esters such as cellulose acetate generally have a poor thermoplasticity, they are usually used in compositions containing plasticizers.

JP-A 10-306175 is an invention related to a fatty acid cellulose ester-based resin composition, and describes that a known plasticizer can be blended therein (Paragraph 0023).

JP-A 2005-194302 is an invention related to a resin composition composed of a cellulose ester with an average degree of substitution of 2.7 or less, a plasticizer and a filler, and describes that a phosphate ester or the like can be used as the plasticizer (Paragraph 0020).

JP-A 2008-260895 is an invention of a film including a polylactic acid resin composition obtained by blending benzyl alkyl diglycol adipate, which is effective as a plasticizer for polylactic acid resins. In the Examples, benzyl methyl diglycol adipate is used (Paragraph 0034).

SUMMARY OF THE INVENTION

An object of the present invention is to provide a cellulose ester composition having a high thermoplasticity.

As a solution for the problems, the present invention provides a cellulose ester composition including: (A) a cellulose ester and (B) a plasticizer, wherein the plasticizer of the component (B) contains at least one selected from adipic acid esters respectively represented by the following formulae (I), (II) and (III).

Formula 1

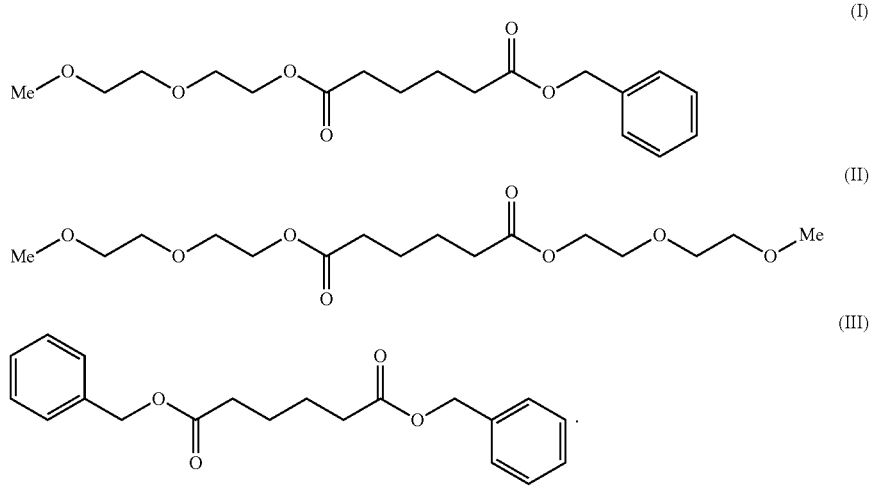

As the solution for the problems, the present invention provides a cellulose ester composition including: (A) a cellulose ester and (B) a plasticizer, wherein the plasticizer of the component (B) includes at least one selected from adipic acid esters represented by the following formulae (IV), (V) and (VI).

Formula 2

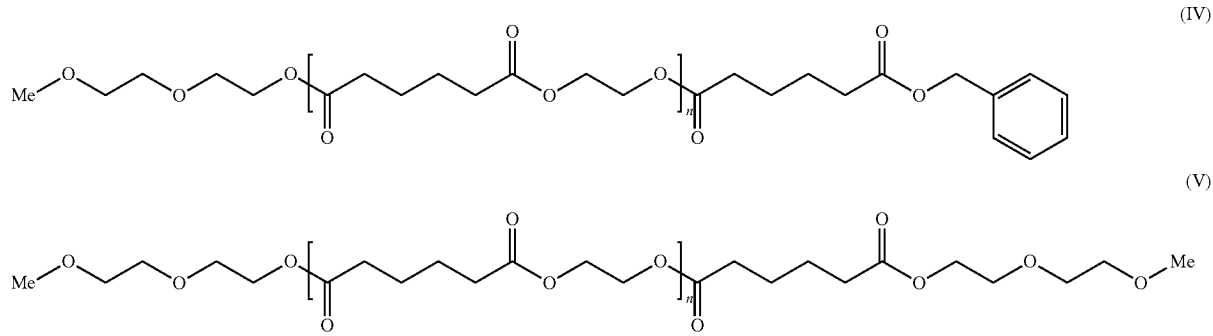

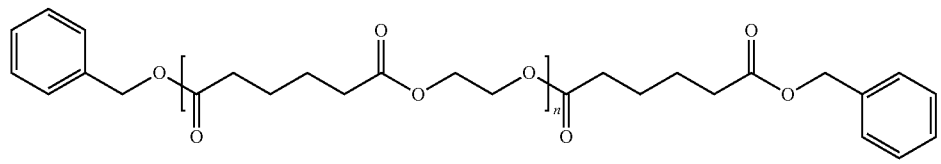

(VI)

In the general formulae (IV), (V) and (VI), n is an integer of 0-5 representing a degree of condensation, which includes the cases where n=0 and n=1-5. "Me" represents a methyl group.

The cellulose ester composition of the present invention has a high thermoplasticity.

DETAILED DESCRIPTION OF THE INVENTION

<Component (A)>

The cellulose ester of the component (A) used for the composition of the present invention is a known one (for example, those described in JP-A 10-306175 and JP-A 2005-194302), and can include cellulose acetate, cellulose propionate, cellulose butyrate, cellulose acetate propionate and cellulose acetate butyrate.

Additionally, the cellulose ester of the component (A) can include polycaprolactone-grafted cellulose acetate, acetyl methyl cellulose, acetyl ethyl cellulose, acetyl propyl cellulose, acetyl hydroxyethyl cellulose, acetyl hydroxypropyl cellulose, and the like.

The cellulose ester of the component (A) is preferably a cellulose acetate having an average degree of substitution of 2.7 or less.

A polymerization degree of the cellulose ester of the component (A) is 100-1000, preferably 100-500 as a viscosity-average polymerization degree.

<Component (B)>

The plasticizer of the component (B) used for the composition of the present invention includes ones selected from adipic acid esters represented by the following formulae (I), (II) and (III). Note that the "Me" represents a methyl group.

Among the adipic acid esters represented by the formulae (I), (II) and (III), a plasticizer containing only the adipic acid ester of the formula (I), a plasticizer containing a mixture of the adipic acid esters of the formulae (I) and (II), or a plasticizer containing a mixture of the adipic acid esters of the formulae (I), (II) and (III) can be used as the plasticizer of the component (B).

When the plasticizer containing a mixture of the adipic acid esters of the formulae (I) and (II) is used as the component (B), a content ratio of the adipic acid ester of the formula (I) is preferably 35-80% by mass, more preferably 40-80% by mass, and a content ratio of the adipic acid ester of the formula (II) is preferably 65-20% by mass, more preferably 60-20% by mass.

When the plasticizer containing a mixture of the adipic acid esters of the formulae (I), (II) and (III) is used as the component (B), a content ratio of the adipic acid ester of the formula (I) is preferably 35-80% by mass, more preferably 40-75% by mass, a content ratio of the adipic acid ester of the formula (II) is preferably 15-50% by mass, more preferably 20-50% by mass, and a content ratio of the adipic acid ester of the formula (III) is preferably 5-35% by mass, more preferably 5-30% by mass.

As to the composition of the present invention, a plasticizer including an adipic acid ester selected from adipic acid esters represented by the following the general formulae (IV), (V) and (VI) can also be used as the plasticizer of the component (B).

Formula 3

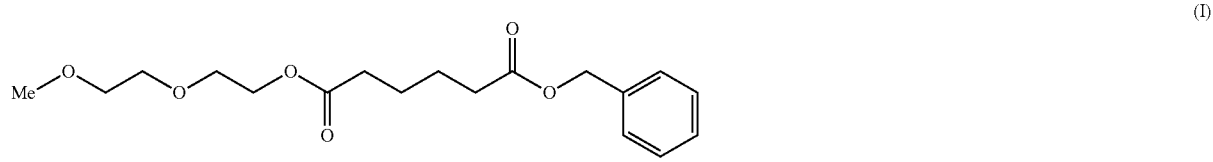

(I)

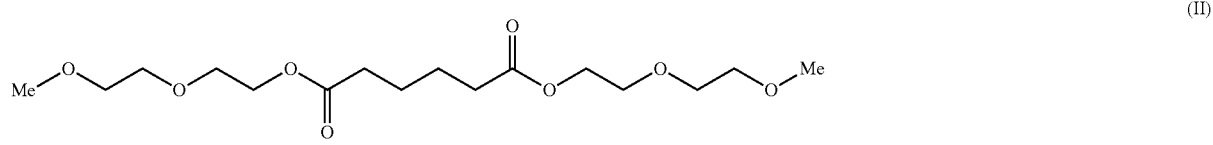

(II)

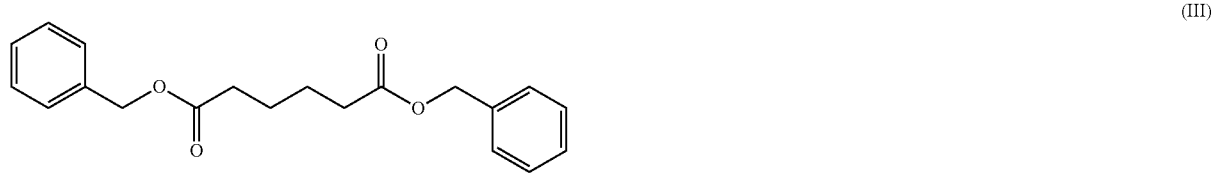

(III)

Formula 4

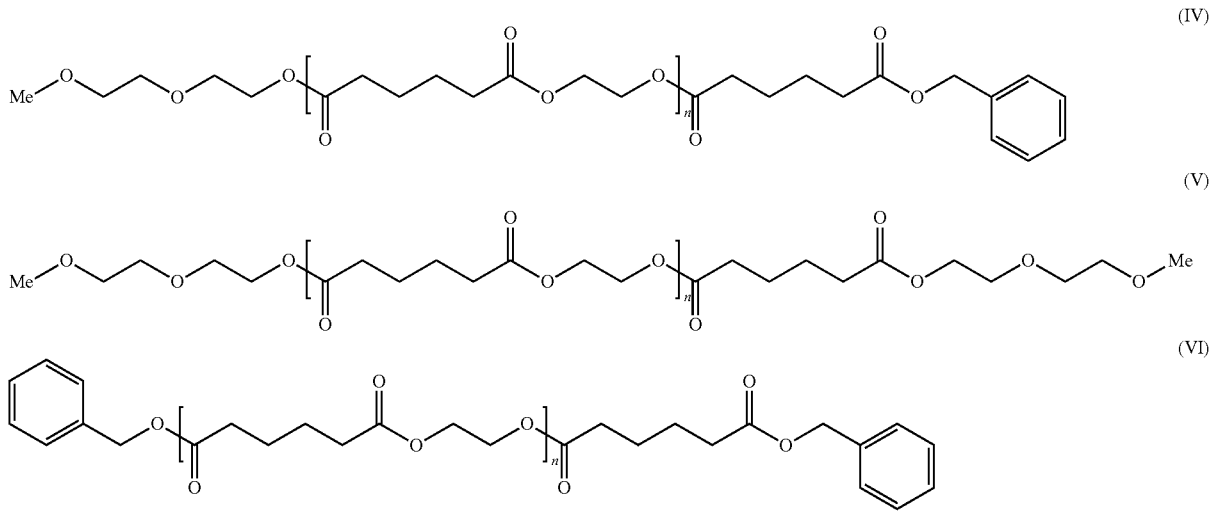

In the general formulae (IV), (V) and (VI), n is an integer of 0-5 representing a degree of condensation, which includes the cases where n=0 and n=1-5.

Each of the adipic acid esters represented by the general formulae (IV), (V) and (VI) contained in the plasticizer of the component (B) is a mixture of the adipic acid esters of n=0 and the adipic acid esters of n=1-5.

An average degree of condensation (N) of the adipic acid esters represented by the general formulae (IV), (V) and (VI) ranges 0<N<5, preferably 0<N≤4, more preferably 0<N≤3.

When the plasticizer of the component (B) contains the adipic acid esters represented by the general formulae (IV), (V) and (VI), a content ratio of the adipic acid esters of n=0 to the total amount of the adipic acid esters represented by the general formulae (IV), (V) and (VI) is preferably 10% by mass or more, more preferably 10-70% by mass, and further more preferably 15-60% by mass.

Note that the adipic acid esters of n=0 are the adipic acid esters of the above-described formulae (I), (II) and (III).

As the adipic acid esters of the formulae (I), (II) and (III) in the adipic acid esters of n=0 contained in the adipic acid esters represented by the general formulae (IV), (V) and (VI), there can be used:

adipic acid esters containing only adipic acid esters of the formula (I);

adipic acid esters containing a mixture of adipic acid esters of the formulae (I) and (II); and adipic acid esters containing a mixture of adipic acid esters of the formulae (I), (II) and (III).

When the adipic acid ester of n=0 is a mixture of the adipic acid esters of the formulae (I) and (II), a content ratio of the adipic acid ester of the formula (I) is preferably 35-80% by mass, more preferably 40-80% by mass, and a content ratio of the adipic acid ester of the formula (II) is preferably 65-20% by mass, more preferably 60-20% by mass.

When the adipic acid ester of n=0 is a mixture of the adipic acid esters adipic acid esters of the formulae (I), (II) and (III), a content ratio of the adipic acid ester of the formula (I) is preferably 35-70% by mass, more preferably 40-70% by mass, a content ratio of the adipic acid ester of the formula (II) is preferably 15-50% by mass, more preferably 15-40% by mass, and a content ratio of the adipic acid ester of the formula (III) is preferably 15-35% by mass, more preferably 15-30% by mass.

As to the content ratios of the component (A) and the component (B) in the composition of the present invention, the content ratio of the component (B) is 1-50 parts by mass, preferably 5-30 parts by mass relative to 100 parts by mass of the component (A).

The composition of the present invention can contain known thermoplastic resins in accordance with the uses.

The known thermoplastic resins can include styrene-based resins such as ABS resins and AS resins; polycarbonate-based resins; polyolefin-based resins such as polyethylene and polypropylene; polyamide-based resins such as polyamide 6, polyamide 66, polyamide 610 and polyamide 612; acrylic resins; methacrylic resins; polyester-based resins; polyacetal-based resins; polyphenylene sulfide-based resins; and the like.

A content ratio of the known thermoplastic resins to the total amount together with the cellulose ester of the component (A) is preferably 40% by mass or less, more preferably 20% by mass.

The composition of the present invention can contain not only the plasticizer of the component (B) but also known plasticizers.

For example, the composition may contain:

aromatic carboxylate esters (phthalic acid di-C1-12 alkyl esters such as dimethyl phthalate, diethyl phthalate, dibutyl phthalate, dihexyl phthalate, dioctyl phthalate and di-2-ethylhexyl phthalate; phthalic acid C1-6 alkoxy C1-12 alkyl esters such as dimethoxyethyl phthalate; phthalic acid C1-12 alkylaryl-C1-3 alkyl esters such as butyl benzyl phthalate; C1-6 alkylphthalyl C2-4 alkylene glycolates such as ethylphthalyl ethylene glycolate and butylphthalyl butylene glycolate; trimellitic acid tri-C1-12 alkyl esters such as trimethyl trimellitate, triethyl trimellitate, trioctyl trimellitate and tri-2-ethylhexyl trimellitate; pyromellitic acid tetra-C1-12 alkyl esters such as tetraoctyl pyromellitate; and the like), fatty acid esters (adipic acid esters such as dibutyl adipate, dioctyl adipate, butoxyethoxyethylbenzyl adipate and dibutoxyethoxyethyl adipate; azelaic acid esters such as diethyl azelate, dibutyl azelate and dioctyl azelate; sebacic acid esters such as dibutyl sebacate and dioctyl sebacate; butyl oleate; methylacetyl ricinoleate: and the like), lower fatty acid esters of polyhydric alcohols (glycerin, trimethylol propane, pentaerythritol, sorbitol, and the like) (triacetin, diglycerine tetraacetate, and the like), glycol esters (dipropylene glycol dibenzoate, and the like), citric acid esters (acetyl tributyl citrate, and the like)

amides (N-butyl benzene sulfonamide, and the like)

ester oligomers (caprolactone oligomer, and the like) and the like.

These plasticizers can be used alone or in a combination of two or more kinds thereof.

The composition of the present invention can further contain a filler.

The filler may include a fibrous filler and a non-fibrous filler (powder-particle filler, plate-like filler or the like) and can be exemplified by a filler described in JP-A 2005-194302, Paragraphs 0025-0032.

A content ratio of the filler is preferably 5-50 parts by mass, more preferably 5-40 parts by mass, and further more preferably 5-30 parts by mass relative to 100 parts by mass of the cellulose ester of the component (A).

The composition of the present invention can contain stabilizers such as an epoxy compound described in Paragraphs 0035-0042 in JP-A 2005-194302, and organic acids, thioether or phosphorous acid ester compounds described in Paragraphs 0043-0052.

The composition of the present invention may include commonly used additives, for example other stabilizers (e.g. antioxidants, ultraviolet absorbers, heat stabilizers, light stabilizers, and the like), colorants (dye, pigment, and the like), flame retardants, antistatic agents, lubricants, antiblocking agents, dispersants, fluidizer, dripping inhibitors, antimicrobial agents and the like, in accordance with the uses.

As to the composition of the present invention, each component may be prepared using a mixer such as a tumbler mixer, a Henshel mixer, a ribbon mixer or a kneader, by a dry or wet process.

Furthermore, after premixing by the mixer, there can be applied a method of kneading the composition by an extruder such as a single screw or twin screw extruder and preparing the resultant product into pellets, or a method of melting and kneading the composition by a kneader such as a heating roller and Banbury mixer for preparation.

The composition of the present invention can be molded into various molded articles by injection molding, extrusion molding, vacuum molding, profile molding, foam molding, injection press, press molding, blow molding, gas injection molding, and the like.

The composition of the present invention can be used for, for example, individual parts, housings and the like such as in the OA/household electrical appliance field, the electric/electronic field, the telecommunication equipment field, the sanitary field, the transport vehicle field like automobiles, the housing-related field such as furniture and building materials, and the general merchandise field.

EXAMPLES

Examples and Comparative Example

As samples for measuring mass reduction rates under heat and humidity conditions, the cellulose acetate of the component (A) shown in Table 2, the plasticizer of the component (B) shown in Tables 1 and 2, and components for comparison shown in Table 2 were charged into a batch-type kneader "LABO PLASTOMILL" manufactured by TOYO SEIKI Co., Ltd., and were kneaded under the conditions of a predetermined temperature of 210° C., a blade rotation rate of 100 r/m, and a kneading time of 5 minutes to thereby give each composition.

Component (A)

Cellulose acetate: Trade name "L50" manufactured by Daicel Corporation, substitution degree: 2.5, viscosity-average polymerization degree: 180

Component (B)

Production Example 1 (Plasticizer Shown in B-1 of Table 1)

146.1 g (1 mol) of adipic acid, 129.8 g (1.2 mol) of benzyl alcohol, 144.2 g (1.2 mol) of diethylene glycol monomethyl ether, 0.95 g of p-toluenesulfonic acid and 120 g of toluene were charged into a four-neck flask of 1 liter provided with a thermometer, a stirrer, a condenser and a water dividing unit, and were refluxed and caused to react for 8 hours, while water produced was drained by using the water dividing unit.

After neutralization with 2.9 g of sodium carbonate and water, the removal of the residual solvent and residual alcohol by water washing, desolvation and steam distillation gave the target product having the composition shown in B-1 of Table 1, at a yield of 96.9%.

Note that content ratios of adipic acid esters represented by the formulae (I), (II) and (III) were measured by gas chromatography (GC). The measurement conditions are shown below.

Column: DB-1, 30 m, 0.32 mmØ, film: 0.25 μm
Temperature: Sample vaporizing chamber 200° C.
Column thermostat bath: from 50° C. (5 min.), increased at 15° C./min. to 250° C. (10 min.)
Detector: 280° C.
Carrier gas: He (Pressure at an inlet: 100 kPa)
Detector: FID ($H_2$ 40.0 mL/min., Air 400.0 mL/min.)
Split 54
Injection volume: 0.5 μl (Sample: about 0.2 g/10 ml acetone)

Production Example 2 (Plasticizer Shown in B-2 of Table 1)

A target product shown in B-2 of Table 1 was obtained at a yield of 92.3% in the same way as that of Production example 1 except that the amount of benzyl alcohol was changed to 77.9 g (0.72 mol), and the amount of diethylene glycol monomethyl ether was changed to 201.8 g (1.68 mol).

Production Example 3 (Plasticizer Shown in B-3 of Table 1)

146.1 g (1 mol) of adipic acid, 120.2 g (1 mol) of diethylene glycol monomethyl ether, 0.95 g of p-toluenesulfonic acid and 100 g of toluene were charged into a four-neck flask of 0.5 liter provided with a thermometer, a stirrer, a condenser and a water dividing unit, and were refluxed and caused to react for 4.5 hours, while water produced was drained by using the water dividing unit. The reaction liquid was cooled to 5° C., and a precipitated and unreacted adipic acid was filtered out and removed.

The filtrate was returned to the flask, to which 28.3 g of sodium carbonate and 170 g of water were added, and caused to react at 70° C. for 30 minutes. The reaction solution was left at rest to separate into an aqueous layer and an oil layer, and the dehydration of the aqueous layer gave 145.9 g of sodium salt.

73.4 g (0.58 mol) of benzyl chloride, 12.2 g of benzyltriethylammonium chloride and 130 g of toluene were added to the obtained sodium salt, and caused to react at 80° C. for 2 hours. Then, water washing, neutralization, desolvation and steam distillation were carried out to give 146.3 g of the compound represented by the formula (I) as a target product.

Production Example 4 (Plasticizer Shown in B-4 of Table 1)

146.1 g (1 mol) of adipic acid, 288.2 g (2.4 mol) of diethylene glycol monomethyl ether, 0.95 g of p-toluenesulfonic acid and 120 g of toluene were charged into a four-neck flask of 1 liter provided with a thermometer, a stirrer, a condenser and a water dividing unit, and were refluxed and caused to react for 8 hours, while water produced was drained by using the water dividing unit.

After neutralization with 2.9 g of sodium carbonate and water, the removal of the residual solvent and residual alcohol by water washing, desolvation and steam distillation gave the compound represented by formula (II), at a yield of 94.6%.

The mixing of the resultant product with the compound represented by the formula (I) obtained in Production Example 3 in the composition shown in B-4 of Table 1 gave a target product.

Production Example 5 (Plasticizer Shown in B-5 of Table 1)

291.9 g (2.0 mol) of adipic acid, 48.2 g (0.8 mol) of ethylene glycol, 0.12 g of tetraisopropyl titanate and 42.6 g of toluene were charged into a four-neck flask of 1 liter provided with a thermometer, a stirrer, a condenser and a water dividing unit, and were refluxed and caused to react for 10 hours, while water produced was drained by using the water dividing unit.

Subsequently, 161.2 g (1.49 mol) of benzyl alcohol, 179.0 g (1.49 mol) of diethylene glycol monomethyl ether were added to the resultant product, and were refluxed and caused to react for 11 hours, while water produced was drained.

The removal of the residual solvent and residual alcohol by desolvation and steam distillation gave a target product of the composition shown in B-5 of Table 1, at a yield of 100%.

Production Example 6 (Plasticizer Shown in B-6 of Table 1)

A target product shown in B-6 of Table 1 was obtained at a yield of 100% in the same way as that of Production example 5 except that the amount of ethylene glycol was changed to 105.5 g (1.7 mol), the amount of benzyl alcohol was changed to 102.7 g (0.95 mol), and the amount of diethylene glycol monomethyl ether was changed to 114.1 g (0.95 mol).

TABLE 1

| | | Plasticizer of the component (B) | | | | | |
|---|---|---|---|---|---|---|---|
| | | (B-1) | (B-2) | (B-3) | (B-4) | (B-5) | (B-6) |
| | (I-1) (mass %) | 50 | 50 | 100 | 67 | — | — |
| | (II-1) (mass %) | 25 | 40 | 0 | 33 | — | — |
| | (III-1) (mass %) | 25 | 10 | 0 | 0 | — | — |
| Ratio of n = 0 (mass %) | | — | — | — | — | 55 | 23 |
| Ratio to | (I-1) (mass %) | — | — | — | — | 55 | 54 |
| adipic acid | (II-1) (mass %) | — | — | — | — | 23 | 26 |
| esters of | (III-1) (mass %) | — | — | — | — | 22 | 20 |
| n = 0 | | | | | | | |

The (B-5) includes the adipic acid esters (n=0) of the formulae (I-1), (II-1) and (III-1) and includes the following formulae (IV-1), (V-1) and (VI-1) as residues.

The (B-6) includes the adipic acid esters (n=0) of the formulae (I-1), (II-1) and (III-1) and includes the following formulae (IV-2), (V-2) and (VI-2) as residues.

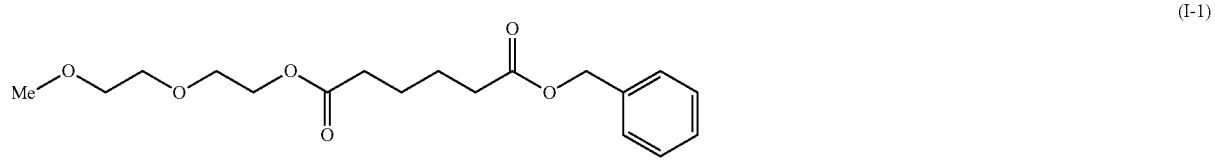

(I-1)

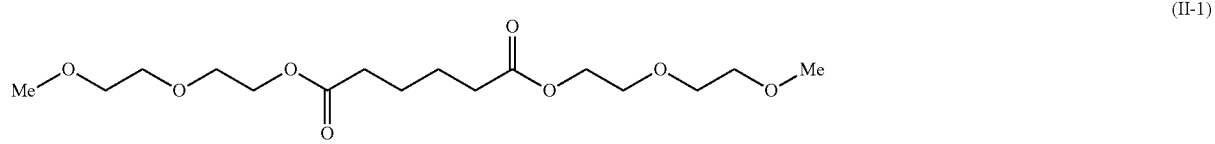

(II-1)

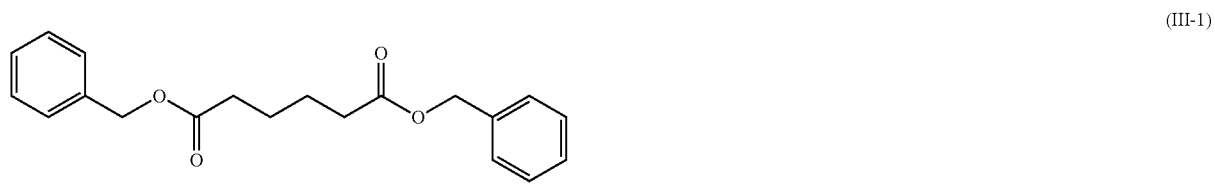

(III-1)

-continued

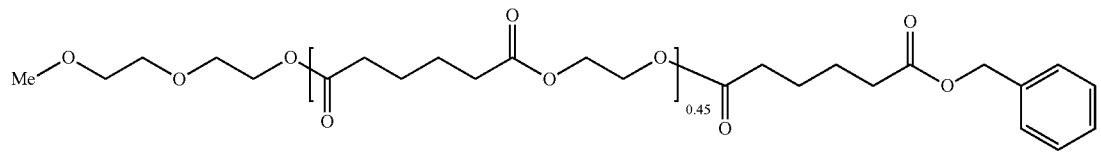
(IV-1)

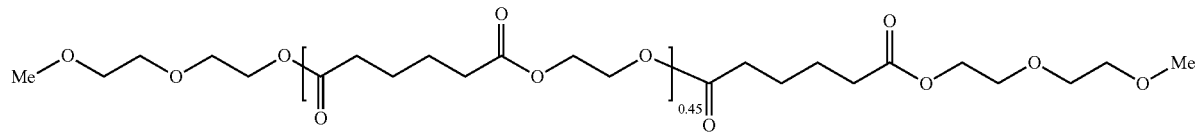
(V-1)

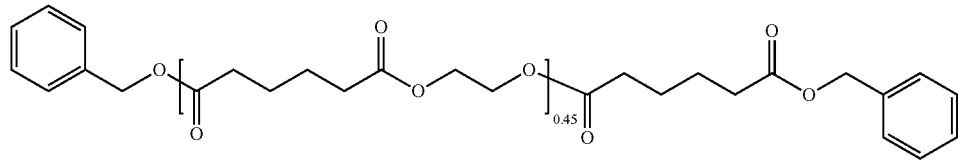
(VI-1)

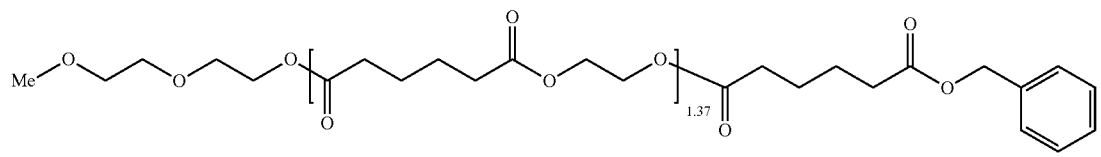
(IV-2)

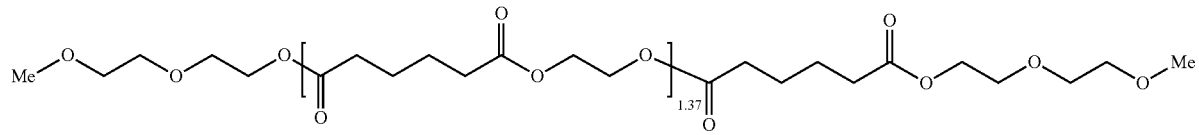
(V-2)

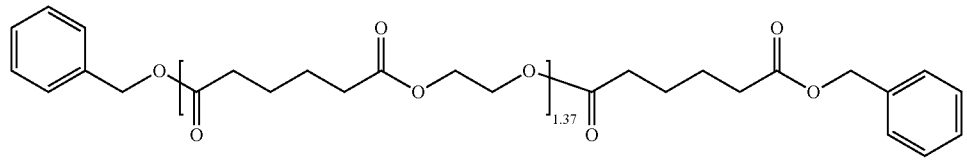
(VI-2)

Each of the numeric values in the general formulae (IV-1), (V-1), (VI-1), (IV-2), (V-2) and (VI-2) represents an average degree of condensation (N) when preparing a mixture of the adipic acid esters of n=0 and n=1-5 in the general formulae (IV), (V) and (VI).

Each average degree of condensation (N) was obtained from an ester value measured by the following method.

About 1 g of sample was weighed, to which 25 ml of a 0.5 mol/L KOH ethanol solution was added, decomposed in a hot-water bath for one hour, and then the ester value was calculated from the amount of consumed KOH through the use of phenolphthalein as an indicator, by titrating the resultant product with a 0.5 mol/L hydrochloric acid aqueous solution.

The ester value is an mg value of potassium hydroxide required for saponifying 1 g of sample and can be calculated by the following equation:

Ester value=number of ester bonds in one molecule× 56.1×1000/molecular weight.

In the case of the general formula (IV), (V) or (VI), the number of ester bonds and the molecular weight can be calculated from its degree of condensation, and thus an average degree of condensation N can be calculated from its ester value.

For example, since an average molecular weight of the general formula (IV) is 338.40+172.18×N and an average number of the ester bonds is 2N+2, an ester value of the general formula (IV) can be obtained from the following equation.

Ester value of the general formula (IV)=(2$N$+2)× 56.1×1000/(338.40+172.18×$N$)

The plasticizers shown in B-5 and B-6 in Table 1 are mixtures of the general formulae (IV), (V) and (VI), but their main ingredients are considered to be the general formula (IV), and thus the calculation example was shown from the above-described equation as the general formula (IV).

In the case of the plasticizer shown in B-5, the ester value is 392.2, and when N is calculated from the above-described equation, N is 0.45.

Additionally, a ratio of the adipic acid esters of n=0, and ratios of the adipic acid esters of the formulae (I), (II) and (III) in the adipic acid esters of n=0 were calculated by the above-mentioned GC measurement.

The component (B) for comparison: Trade name "DRA150" (triacetin) (diglycerine tetraacetate), manufactured by Daicel Corporation Each evaluation test was carried out by the method described below through the use of each composition in the Examples and a Comparative Example. The results of the evaluations are shown in Table 2.

Each composition was stirred and mixed using a Henschel mixer so that the temperature was 70° C. or more by frictional heat in the mixer, then supplied into a twin screw extruder (temperature of cylinder; 200° C., temperature of die; 220° C.), and pelletized by extrusion.

The obtained pellets were supplied into an injection-molding machine, and test specimens were injection-molded under the condition of a cylinder temperature of 200° C., a mold temperature of 50° C., and a molding cycle of 30 sec. (injection period; 15 sec. and cooling period; 15 sec.) and were used for each evaluation test.

(MFR)

A measurement was carried out at 220° C., under a load of 10 kg on the basis of 1501133. It is indicated that the larger the MFR, the better the thermoplasticity.

(Nominal Tensile Strain)

A nominal tensile strain of the test specimen was measured in according with 150527 (unit of nominal tensile strain: %).

(Shock Resistance (Charpy))

A Charpy impact strength ($kJ/m^2$) was measured in according with ISO179/1eA (unit: $kJ/m^2$).

(Mass Reduction Rate Under Heat and Humidity Conditions)

The cellulose acetate composition obtained by using "LABO PLASTOMILL" was molded using a press forming machine at a predetermined temperature of 210° C. to produce a plate-like sample of 80×50×2 mm. A mass reduction rate (reduction rate relative to mass after 24 hours) of the plate-like sample after leaving this plate-like sample to stand for 500 hours in an atmosphere of 65° C. and 85% RH was obtained.

component (B) includes a mixture of adipic acid esters respectively represented by the following formulae (IV), (V) and (VI),

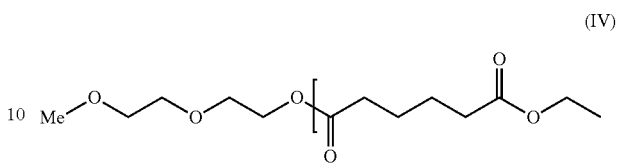

(IV)

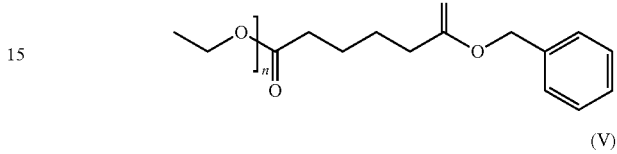

(V)

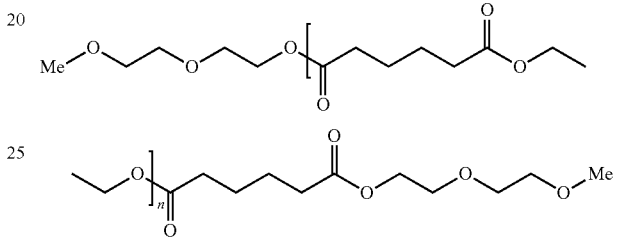

(VI)

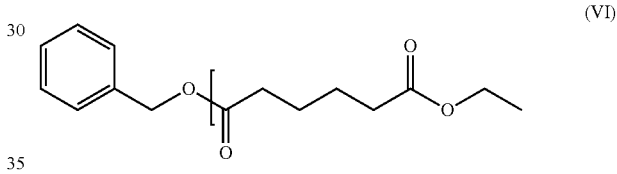

TABLE 2

| | Examples | | | | | | Comparative Example |
|---|---|---|---|---|---|---|---|
| | 1 | 2 | 3 | 4 | 5 | 6 | 1 |
| (A) Cellulose ester (parts by mass) | 100 | 100 | 100 | 100 | 100 | 100 | 100 |
| (B) (B-1) (parts by mass) | 25 | | | | | | |
| (B-2) (parts by mass) | | 25 | | | | | |
| (B-3) (parts by mass) | | | 25 | | | | |
| (B-4) (parts by mass) | | | | 25 | | | |
| (B-5) (parts by mass) | | | | | 25 | | |
| (B-6) (parts by mass) | | | | | | 25 | |
| Triacetin (parts by mass) | | | | | | | 25 |
| MFR (g/10 min), 220° C., 10 kg | 15.2 | 16.2 | 19.7 | 23.0 | 11.1 | 7.9 | 2.9 |
| Nominal tensile strain (%) | 14.3 | 13.5 | 14.4 | 13.5 | 13.5 | 14.1 | 8.7 |
| Charpy impact strength ($KJ/m^2$) | 10.3 | 10.0 | 11.0 | 10.5 | 9.7 | 6.2 | 5.1 |
| Specific gravity | 1.28 | 1.28 | 1.28 | 1.28 | 1.29 | 1.29 | 1.30 |
| Mass reduction rate under heat and humidity conditions | 0.5-1% | less than 0.5% | less than 0.5% | less than 0.5% | less than 0.5% | less than 0.5% | 2-3% |

Examples 1-6 had higher MFR values than the value of Comparative Example 1, thereby exhibiting a higher thermoplasticity. Particularly, the composition having a high content of the adipic acid ester of the formula (I) and low content of the adipic acid ester of the formula (III) exhibited a high thermoplasticity.

What is claimed is:

1. A cellulose ester composition comprising: (A) a cellulose ester and (B) a plasticizer, wherein the plasticizer of -continued

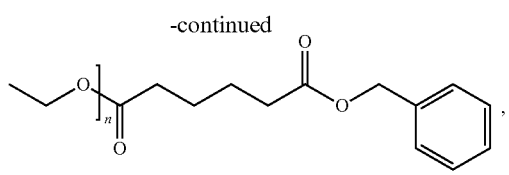

wherein n is an integer of 0 and n=1-5.

2. The cellulose ester composition according to claim 1, wherein the plasticizer of the component (B) contains 10% by mass or more of adipic acid esters of n=0 relative to the total amount of the adipic acid esters represented by the general formulae (IV), (V) and (VI).

3. The cellulose ester composition according to claim 1, which contains 1-50 parts by mass of the plasticizer of the component (B) relative to 100 parts by mass of the cellulose ester of the component (A).

4. The cellulose ester composition according to claim 1, wherein the cellulose ester of the component (A) is selected from cellulose acetate, cellulose acetate propionate and cellulose acetate butylate.

5. The cellulose ester composition according to claim 1, wherein the cellulose ester of the component (A) is a cellulose acetate having a substitution degree of 2.7 or less.

* * * * *